United States Patent [19]

Chupka

[11] 3,873,410
[45] Mar. 25, 1975

[54] METHOD AND APPARATUS FOR RECOVERING PAPER FIBERS FROM WASTE PAPER CONTAINING MATERIALS

[75] Inventor: David E. Chupka, Middletown, Ohio

[73] Assignee: The Black Clawson Company, Middletown, Ohio

[22] Filed: Aug. 27, 1973

[21] Appl. No.: 391,589

[52] U.S. Cl. .................... 162/4, 162/264, 209/273, 241/24, 241/28
[51] Int. Cl. ............................................. D21b 1/32
[58] Field of Search .......... 162/4, 191, 264; 241/21, 241/24, 25, 28; 209/273

[56] References Cited
UNITED STATES PATENTS

| | | | |
|---|---|---|---|
| 2,331,455 | 10/1943 | Cowles | 162/4 X |
| 2,954,173 | 9/1960 | Dunwody | 241/24 |
| 3,016,323 | 1/1962 | Altmann et al. | 162/4 |
| 3,264,169 | 8/1966 | Altmann et al. | 162/4 |
| 3,339,851 | 9/1967 | Felton et al. | 241/46.17 |
| 3,549,092 | 12/1970 | Baxter, Jr. | 241/21 X |
| 3,680,696 | 8/1972 | Morin | 209/273 X |
| 3,736,223 | 5/1973 | Marsh | 162/4 |

FOREIGN PATENTS OR APPLICATIONS

| | | | |
|---|---|---|---|
| 727,010 | 2/1966 | Canada | 162/4 |

Primary Examiner—S. Leon Bashore
Assistant Examiner—Alfred D'Andrea, Jr.
Attorney, Agent, or Firm—Biebel, French & Bugg

[57] ABSTRACT

Waste paper containing materials, e.g., commercial "waste paper" or municipal waste, are treated for recovery of reusable paper therefrom by slushing in a pulper followed by screening of the entire output extracted from the pulper, with or without an intermediate centrifugal cleaning operation, in a screen having fine perforations sized to accept only substantially fully defibered paper. The reject flow from this screen is maintained at an adequately high rate, e.g., 20–80% to assure freedom from blocking of the screen perforations. A deflaker is connected to receive this reject flow, and the output of the deflaker is separated by a tailing screen into accepts which are recycled to the primary screen and rejects which are eliminated from the system. Major advantages of this method and system include the use of only one piece of apparatus for each of the essential operations of pulping, screening and deflaking, the elimination of low specific gravity reject from the system at a single station, and distribution of power requirements in such manner that the ratio of pulping power to deflaking power is 1.5 or less.

12 Claims, 1 Drawing Figure

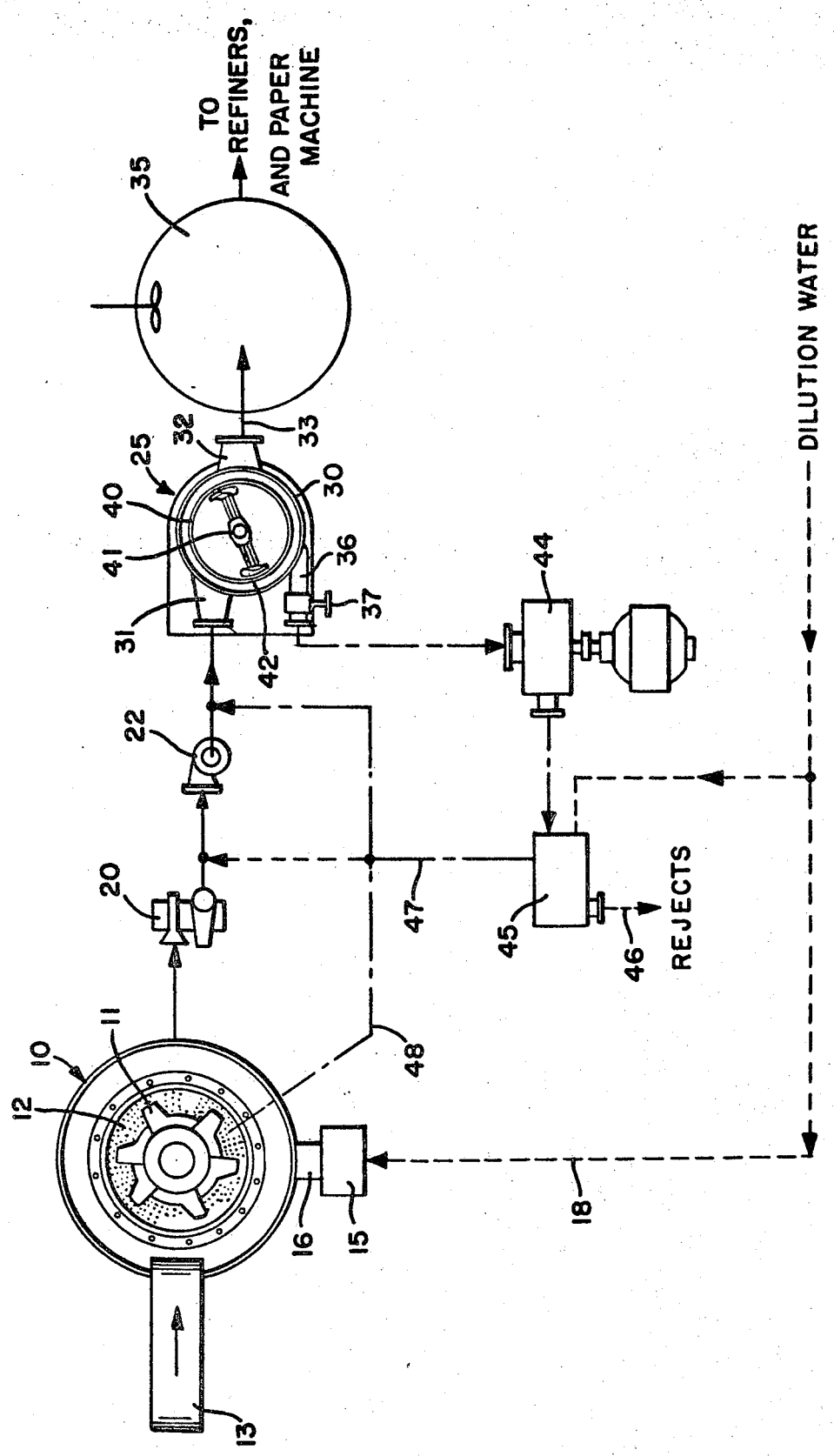

METHOD AND APPARATUS FOR RECOVERING PAPER FIBERS FROM WASTE PAPER CONTAINING MATERIALS

BACKGROUND OF THE INVENTION

Waste papers have for many years been an important source of fiber for use, or rather for reuse, in the manufacture of new paper products, and waste paper materials of a variety of types and grades are recognized commodities for purchase by paper and paper board mills. There has in recent years been increasing emphasis on such recycling of used paper materials, and this emphasis has now extended to the recovery of reusable paper fiber from municipal solid waste, by means of the system and method disclosed in my assignee's recent U.S. Pat. No. 3,736,223.

The recycling of commercially available waste paper has always presented some problems of cleaning and screening because the economics of collecting, sorting and baling of used paper products commonly result in the inclusion of substantial quantities of inorganic contaminents as well as plastic, rags and the like. These problems are greatly increased when the source material is municipal waste, which commonly includes garbage and other food waste, metal products of all kinds, refuse vegetation, and many types of plastic waste, etc.

The high specific gravity contaminents of waste paper mixtures are not difficult to separate from the paper, by conventional junk removers and centrifugal cleaners. The more serious problems derive from the plastic and other trash which have specific gravities so close to that of cellulose fiber that gravity separation is not effective.

More specifically, pulpers such as are commonly used for initially breaking down waste paper are quite efficient for slushing but less so for complete defibering, and much longer pulping time is required if the pulper is relied upon to reduce the paper to particle sizes capable of passage through relatively small holes, e.g., ⅜ inch in diameter or less. Under such conditions, however, the plastic constituents of the mix will not be correspondingly reduced in particle size, and they will tend to accumulate in the pulper, both overloading it and also interfering with proper extraction of the defibered paper. This in turn will result in such loss in the effectiveness of the pulper, as well as such excessive power demands, that frequent stops for cleaning out the pulper become necessary.

When attempts were made in the past to avoid this problem by the use of larger extraction holes from the pulper, other difficulties resulted. For example, since a portion of the paper charge is not completely defibered, many paper pieces will be comparable in size to the fragments of plastic and cannot readily be separated by screening. This problem can be overcome by subjecting the mixed fibers and fragments to treatment in apparatus of the type known as deflakers which will defiber the paper without comparable reduction of the particle sizes of the plastic, but such treatment is inefficient because the defibering apparatus must handle both the plastic, the paper pieces, and the already defibered paper, with resulting wasteful consumption of power.

These various problems have been attacked in the past by a variety of systems and treatments, but generally the attempted solutions have resulted in relatively complex systems embodying coarse and fine screens with defibering apparatus connected to receive the materials rejected by the screens and to recycle the resulting accepted materials for rescreening, as shown for example in the above U.S. Pat. No. 3,736,223. The net result has been relatively substantial initial capital costs as well as continuing high power requirements.

SUMMARY OF THE INVENTION

The present invention is directed to the provision of methods of preparing waste paper for reuse which can be performed by a greatly simplified system having relatively low initial capital cost and high efficiency from the standpoint of results as well as power requirements. This objective is accomplished by such arrangements and control of the different stations in the system that the pulper is utilized only for slushing rather than for complete defibering of the paper, the slushed and centrifugally cleaned slurry is then screened at high consistency and with a high reject rate to separate such paper as has been essentially defibered from the plastic and remaining paper, and the material rejected by the screen is then directed to a deflaker from which the accepted material is recycled in the system.

When the system is arranged and operated in this manner, each piece of apparatus performs at its own highest efficiency, plastic and other reject material does not accumulate in the pulper, only one screening station is needed, the paper which is defibered in the pulper and accepted by the screen bypasses the deflaker, and the deflaker therefore handles primarily only plastic, other reject and undefibered paper. In test operations, the invention has been practiced successfully with a screen which handles the slushed slurry at consistencies as high as 3–5% and is constructed and controlled to accept only substantially completely defibered paper and to reject approximately 20–80% of its supply flow. The fiber initially accepted by this screen is therefore not further treated in the deflaker, with the result that it contains fewer fines and proportionally more long fibers than pulps produced from waste paper by conventional methods. In addition, it will contain substantially less fine dirt than stock which has been processed in a conventional waste paper system.

In addition to the improved quality of the fiber recovered by the practice of the invention, it offers important advantages over conventional practice in the way of reduced costs of operation as well as most efficient use of the apparatus employed at each station. This can be quickly demonstrated by comparison with two typical systems or modes of operation in accordance with the prior art, identified for convenience as systems A and B.

In system A, the pulper commonly has ⅜ inch holes in its extraction plate, and it requires approximately 1.25 horsepower per ton per day of furnish to reduce the paper and plastic sufficiently for passage through such holes, e.g., a total of 250 horsepower for a 200-ton per day system. The slurry extracted through such holes is then commonly treated in a deflaker which receives the full flow, and it will require on the order of 3 horsepower per ton per day. The total defibering power is therefore 850 horsepower for these two pieces of apparatus in a 200 ton per day system.

In system B, the pulper has ⅛ inch holes in its extraction plate, and it commonly requires on the order of 2.5 horsepower per ton per day to defiber the paper sufficiently to pass through such fine holes. Plastic and other floating trash, however, will not as readily pulp to such small particle sizes, and separate removing means for such contaminants will require on the order of ½ horsepower per ton per day. Thus the total power required for the pulper and auxiliary dirt removing equipment in a 200-ton per day system will average 600 horsepower, but the deflaker will then carry a considerably lesser load, of the order of 100 horsepower. The total defibering power is therefore 700 horsepower for the two pieces of apparatus in a 200 ton per day system.

In a comparable system according to the invention, the pulper will be equiped with an extraction plate having relatively large holes, e.g., ½ to 2 inches in diameter, 1 inch being typical. Reduction of waste paper to particle sizes capable of passage through such large holes is primarily a slushing action for which the pulper operates at its highest efficiency and requires only about one horsepower per ton per day, or a total of 200 horsepower for a 200-ton per day system.

According to the invention, the resulting extracted slurry is centrifugally cleaned to remove high specific gravity contaminants, as is conventional, and the entire cleaned flow is screened with little or no dilution by means of a screen capable of accepting only substantially fully defibered paper, e.g., through slots of the order of 0.022 inch in width or holes 0.062 inch in diameter, and this screen is controlled to reject whatever proportion of the slurry is necessary to prevent blocking of its perforations by reject materials, which will ordinarily be from 30% to 50% but may range as low as 20% or as high as 80% depending upon how dirty the charge is. Only this reject flow from the screen will require treatment in a deflaker, so that although the deflaker may still require 3 horsepower per ton per day as in system A, if it has to handle only 50% of the flow from the pulper, it will require only 300 horsepower in a 200-ton per day system, and possibly considerably less depending upon the reject flow from the screen, e.g., 180 horsepower for a 30% flow. Accordingly, a system operated according to the invention can accomplish the same defibering results with as little as 500 horsepower which would require 700 horsepower in system B and 800 horsepower in system A. As a general rule, therefore, it may be stated also that in systems according to the invention, the power required for initial and further reduction of particle size is distributed in a ratio of pulping power to deflaking power of 1.5 or less.

In addition to these savings in power consumption, the invention provides important saving in capital costs. More specifically, since the pulper is required only to slush the furnish rather than to defiber it substantially completely, the dwell time within the pulper will be significantly reduced as opposed to conventional practice. This in turn means that a smaller pulper will provide the same per day throughput, with resulting capital cost saving in the pulper itself and in its drive. Similarly, since the deflaker is called upon to handle only a fraction of the discharge flow from the pulper, a smaller unit can be used successfully rather than the size necessary to handle the full output of the pulper.

A particularly significant contribution to capital cost saving derives from the discovery that it is practical to employ only one screen sized to handle the cleaned flow from the pulper at pulping consistency and to accept only fiber of the particle sizes for which the conventional system requires successive coarse and fine screening stations. In this same connection, another significant contribution to the economy of initial cost, as well as operating costs, results from virtual elimination of the necessity for dilution of the slurry before screening, and therefore for thickening prior to storage. These advantages all flow from the practice of the invention under which the furnish progresses from the pulper through cleaning, screening and deflaking stages without significant change in consistency from the range initially established in the pulper.

The invention may accordingly be summarized as comprising a method of preparing waste paper materials for reuse, and a system for carrying out that method, wherein the successive main steps or stations have the following characteristics:

a. Slushing of the mixed waste paper materials under controlled conditions such that as soon as any material is sufficiently reduced in particle size to pass through the selected relatively large extraction holes, it is extracted from the slushing zone, thus utilizing only a fraction of the power which would be required to effect complete defibering;

b. centrifugal cleaning of the extracted slurry if it contains sufficient high specific gravity contaminants to make it desirable to remove them before screening;

c. screening of the cleaned slurry by means of fine screen perforations of such small size that only the substantally completely defibered material is accepted and 20–80% of the feed is rejected;

d. deflaking only the flow rejected in the course of the screening step, and thereby requiring only a fraction of the power which would be required for deflaking the entire cleaned flow from the pulping station;

e. screening the output of the deflaker in a tailing screen; and f. returning the accepts flow from the tailing screen to the supply line to the main screen, directly or via the pulper.

It will be apparent from this summary that the invention relies in part for its effectiveness on the fact that slushing of the waste paper materials sufficiently for extraction through holes of intermediate size, e.g., 1 inch, will result in substantially complete defibering of the major part of the paper, and an important advantage of the practice of the invention is the minimizing of excessive working of already defibered material such as will occur if the entire flow from the pulper is subjected to deflaking preparatory to screening. In other words, since the majority of the materials which are substantially defibered during slushing are accepted at the primary screening station and thereby not subjected to further defibering action, practice of the invention prevents both the degradation of the fibers which can result from excessive treatment and also the generation of unnecessary large quantities of paper fines and of fine dirt.

These practical advantages in the improved quality of the end products are provided by the invention in addition to the significant savings in the power consumption for the slushing and deflaking steps, as well as the most effective use of the power for both of these steps. A further important advantage follows from the preferred practice of the invention wherein the consistency of the furnish is maintained in approximately the same percentage range from the slushing treatment through the screening step. Not only does this minimize the water requirements of the system, but it also eliminates the necessity for diluting and thickening stages before and after the screening step.

BRIEF DESCRIPTION OF THE DRAWINGS

The single FIGURE is a flow diagram illustrating an apparatus system for carrying out the process steps of the invention.

DESCRIPTION OF THE PREFERRED EMBODIMENTS

The system shown in FIG. 1 has at its slushing station a pulper comprising a treatment vessel or tub 10 wherein a rotor 11 rotates above an extraction plate 12 provided with perforations of appropriate size, which for the purposes of the invention should be relatively large, namely of the order of 1 to 2 inches in diameter. A conveyor 13 carries the waste paper material to the tub 10, and it is to be understood that this charge may be selected from its full range of waste paper containing materials from commercial "waste paper" to municipal solid waste. A junk remover 15 is positioned adjacent the tub and communicates therewith through a conduit 16, and water is continuously supplied to the tub by a line 18 through the junk remover 15 and its connecting conduit 16 into the tub.

Preferred examples of pulpers suitable for use in this station include those shown in Felton et al. U.S. Pat. No. 3,339,851 and Blakley et al. U.S. Pat. No. 3,595,488, and details of the junk remover are shown in Baxter U.S. Pat. No. 3,549,092. The essential characteristics of the pulper are that it be capable of subjecting mixed waste paper materials and water to forces of mechanical and hydraulic shear and mechanical impact which will quickly and effectively reduce the solid material in the tub to fragments capable of passage through the perforations in extraction plate 12.

The pulper 10 operates continuously, with additional waste paper and water being added at rates which will maintain the solids content of the mixture in the desired range, 2 to 8% being practical and 3 to 5% being preferred for practical reasons. A slurry of water and fragmented material is continuously withdrawn from below the extraction plate 12 by a pump 20, and if this slurry contains a significant amount of high specific gravity contaminants such as metal and glass, which can be expected if the charge is municipal waste, it is preferably supplied by pump 20 to a centrifugal cleaner 22 for removing the high specific gravity contaminants to simplify the subsequent screening as well as to prevent possible damage to the screen.

The cleaned slurry from the cleaner 22 will contain a considerable proportion of relatively large undefibered pieces of paper as well as pieces of plastic and the like of comparable size, but when the initial slushing operation is carried out in a pulper of the characteristics noted above, the result will also be that a major proportion of the paper will be substantially completely defibered. The invention therefore provides that rather than a series of coarse and fine screening operations and dilute consistencies, this slurry be subjected immediately, and at its maintained high consistency, to a screening operation which will result in acceptance of at least the majority of the substantially completely defibered paper and the rejection of the undefibered paper fragments, plastic and other pieces of reject material.

Highly successful results have been obtained in the practice of the invention with a system as shown wherein the screen 25 is constructed as disclosed in either of the copending applications of Peter Seifert, Ser. Nos. 288,288 filed Sept. 12, 1972, now abandoned and 288,293, filed Sept. 12, 1972 or the copending application of David E. Chupka and Peter Seifert Ser. No. 391,574 filed of even date herewith. The screen 25 is accordingly shown as comprising a main housing 30 having a tangential inlet port 31 at the upper end thereof, an outlet port 32 for accepted stock from which a line 33 leads to a storage chest 35, and a discharge port 36 for reject stock, the port 36 being provided with a control valve 37 for regulating the relative proportions of the flow through the accepts and reject ports.

Within the housing 30 is a screen cylinder 40, and a rotor 41 operates within the cylinder 40 and carries vanes 42 spaced inwardly from the surface of the screen cylinder by a substantial distance in the range of 3/16 to ½ inch. As disclosed in the Seifert applications, the perforations in the screen cylinder 40 may comprise slots running axially of the cylinder or cylindrical holes.

For the purpose of the invention, the perforations in the screen cylinder 40 should be sized to accept only substantially completely defibered paper and particles of similar sizes, and preferred results have been obtained in the practice of the invention with a screen constructed as described wherein these perforations are slots of the order of 0.022 inch in width or perforations of the order of 0.062 inch in diameter, i.e., in the range of approximately 0.050 to 0.079 inch. In the operation of such a screen, the rotor 41 is driven at relatively high speed providing vane speeds of the order of 3,000 to 10,000 feet per minute, the higher speeds being best for handling incoming stock of high consistency in the range of 3–5%.

Under these conditions, the rotating vanes form a tubular layer of stock in the space between them and the screen surface, and create a substantially tangentially oriented hydraulic shear field in that tubular layer wherein the shear rates are sufficient to cause elongated particles to be aligned generally tangentially of the screen member and thereby to flow past rather than through the perforations. Undefibered pieces of paper will therefore be retained inside the screen member for passage through the outlet port 36, and the valve 37 is set to maintain a high reject rate, namely in the range of about 20–80% depending upon how dirty the stock is, so that there will be minimum tendency for undefibered paper particles to block the screen perforations.

The reject flow from screen 25 will therefore contain the undefibered pieces of paper and the plastic and other reject material too small for acceptance by screen 25, and this reject flow is conducted to a deflaker 44 of any satisfactory construction such as, for example, as a disk refiner. In general, it appears that if the consistency of the stock supplied to the screen 25 is in the range of 3–5%, the reject flow will be of slightly high consistency, namely in the range of 4–7%, which is quite satisfactory for defibering purposes.

The flow from the deflaker 44 is preferably supplied to a tailing screen 45 of any suitable type for removing undefibered material, which will include at least the major part of the plastic, and also a major portion of the dirt and other reject material. For example, the screen may be a vibrating flat bed screen of the Jonsson type with perforations larger than screen 25, e.g., ⅛ inch, and the reject therefrom is discharged at 46. The accepts flow from screen 45 does not require further pulping and can be returned at 47 to the supply line to the screen 25, either upstream or downstream of the cleaner 22, but if the screen 45 requires a large volume of dilution water for proper operation, as in the case of a Jonsson screen, at least a substantial portion of the accepts flow should be recycled to the pulper 10, as indicated at 48, to maintain the proper water balance in the system. The screened stock from chest 35 is ready for refining or other treatment in preparation for reuse.

The drawing accordingly illustrates one of the major advantages of the invention, namely the simplicity of the system as compared with conventional practice, particularly in that it comprises only one piece of equipment for each given function, i.e., a single pulper for the entire slushing operation, a single deflaker for whatever defibering is required, and a single screen for the major or primary screening operation. Further, one of the practical advantages of the invention is that this tailing screen station is the principal station for elimination of rejects from the system, rather than from each of a number of screens as when progressively finer screens are connected in series. The reject flow from screen 45 may therefore be substantial, ranging upwards from 10% of the original charge depending upon the initial quality of the waste paper material and being highest when the charge comprises municipal waste.

The drawing further illustrates that by reason of the use of apparatus capable of handling cleaning and screening without requiring dilution of the furnish, it is possible to eliminate dilution stages which would result in the necessity for a thickening stage prior to storage of the screened stock, thereby further contributing to economy of equipment as well as the quantities of water required for operation.

Perhaps the outstanding characteristic of the invention derives from the discovery that it is possible and practical to utilize a single screen for handling the entire output of the pulper, and to confine that screening operation to fine screening at high consistency. Not only does this discovery result in economy of capital cost and operational expense, but because it results in acceptance of the major proportion of the fiber directly from the initial slushing and cleaning stages, it produces a product characterized by a higher percentage of long fibers and a lower percentage of fines than the conventional practice, which in turn contributes to improved strength characteristics in the furnished pulp. Of perhaps equal importance is the fact that this method greatly simplifies cleaning of the furnish, because it minimizes the liberation of fine dirt in the supply flow to the main screen, and much of the dirt liberated in the deflaker is eliminated from the system by the tailing screen 45.

The quality of the results achieved by the invention are especially outstanding when it is recognized that the initial treatment of the furnish is limited to slushing in the pulper, rather than complete defibering, and that this in turn results in extraction from the pulper of pieces of materials such as plastic and wet strength paper which would accumulate in the pulper if smaller sized extraction holes were use. It is especially important that these results can be achieved, because as previously pointed out, the use of large extraction holes, together with fine screening before deflaking, minimizes the operating cost of both the pulper and the deflaker. Further cost advantages also result from the fact that the high throughput rate of a system in accordance with the invention makes it practical to use smaller pieces of equipment than would be required for the same tonage per day under conventional practice. This in turn results in further economies of initial equipment cost and space requirements, as well as a degree of simplicity providing for minimum manpower requirements as well as facilitating automation with its resultant savings.

What is claimed is:

1. The method of treating materials containing waste paper to recover paper fibers therefrom for reuse which comprises the steps of:
    a. supplying said materials and water to a vessel at rates maintaining the consistency of the resulting suspension in the range of approximately 2–8%,
    b. continuously pulping said suspension in said vessel to reduce said materials to fragments,
    c. continuously extracting from said vessel a slurry comprising liquid and such of said fragments as will pass through holes of the order of ½ to 2 inches in diameter,
    d. subjecting said slurry to screening through relatively fine perforations sized to accept only substantially fully defibered paper without preliminary screening thereof,
    e. controlling the accepted and rejected flows from said screening step to maintain at least approximately 20% of the solid materials in said slurry in the resulting rejected flow,
    f. subjecting said flow of rejected materials to a defibering action,
    g. substantially eliminating from the resulting defibered materials the non-fibrous constituents thereof, and
    h. resubjecting the remaining material to said screening step.

2. The method defined in claim 1 including the step of controlling the power requirements for said pulping and defibering step to establish a ratio of not more than approximately 1.5 of pulping power to defibering power.

3. The method defined in claim 1 wherein said screening and defibering steps are carried out without substantial dilution of said slurry.

4. The method defined in claim 1 including the step of subjecting said extracted slurry to centrifugal cleaning to remove high specific gravity materials therefrom, prior to said screening step.

5. The method defined in claim 1 wherein said fine perforations are slots of the order of 0.022 inch in width.

6. The method defined in claim 1 wherein said fine perforations are circular holes of the order of 0.062 inch in diameter.

7. The method defined in claim 1 wherein said screening and controlling step comprises the component steps of:
    a. continuously supplying said extracted slurry to one end of a supply chamber having as one wall thereof a cylindrical screen member having multiple slots therethrough extending generally parallel with the axis thereof,
b. maintaining a pressure difference from said supply chamber to the accepts side of said screen member to cause passage of accepted material through said slots,
c. causing the slurry in said supply chamber to form a tubular layer of substantial thickness and of substantially the same length as said screen member immediately adjacent the surface of said screen member in said supply chamber,
d. creating a substantially tangentially oriented hydraulic shear field in said tubular layer of slurry with shear rates sufficiently high to cause elongated particles to be aligned generally tangentially of said screen member and thereby to flow past rather than through said slots, and
e. continuously removing from the other end of said screen chamber approximately 20–80% of said slurry including such elongated particles.

8. The method defined in claim 1 wherein said screening and controlling step comprises the component steps of:
a. continuously supplying said extracted slurry to one end of a supply chamber having as one wall thereof a cylindrical screen member having multiple substantially circular perforations therethrough,
b. maintaining a pressure difference from said supply chamber to the accepts side of said screen member to cause passage of accepted material through said perforations,
c. causing the slurry in said supply chamber to form a tubular layer of substantial thickness and of substantially the same length as said screen member immediately adjacent the surface of said screen member in said supply chamber,
d. creating a substantially tangentially oriented hydraulic shear field in said tubular layer of slurry with shear rates sufficiently high to cause elongated particles to be aligned generally tangentially of said screen member and thereby to flow past rather than through said perforations, and
e. continuously removing from the other end of said screen chamber approximately 20–80% of said slurry including such elongated particles.

9. Apparatus for treating materials containing waste paper to recover paper fibers therefrom for reuse, comprising:
a. pulping means including a tub,
b. means for supplying said materials and water to said tub at rates maintaining the consistency of the resulting suspension in the range of approximately 2–8%,
c. means for continuously pulping said suspension in said tub to reduce said materials to fragments,
d. means for continuously extracting from said tub a slurry comprising liquid and such of said fragments as will pass through holes of the order of ½ to 2 inches in diameter,
e. screen means connected to receive said slurry and having relatively fine perforations sized to accept only substantially fully defibered paper,
f. means for controlling the accepted and rejected flows from said screen means to maintain at least approximately 20% of the solid materials in said slurry in the resulting rejected flow,
g. defibering means connected to receive the resulting rejected materials from said screen means,
h. a tailing screen connected to receive the resulting defibered materials and to eliminate non-fibrous constituents therefrom, and
i. means for recycling the remaining fibrous material to said screen means.

10. Apparatus as defined in claim 9 further comprising centrifugal cleaning means connected between said tub and said screen to remove high specific gravity materials from said extracted slurry.

11. The method of treating materials containing waste paper to recover paper fibers therefrom for reuse which comprises the steps of:
a. supplying said materials and water to a vessel at rates maintaining the consistency of the resulting suspension in the range of approximately 3–5%,
b. continuously pulping said suspension in said vessel to reduce said materials to fragments,
c. continuously extracting from said vessel a slurry having a consistency of approximately 3–5% of such of said fragments in liquid as will pass through holes of the order of 1 inch in diameter,
d. subjecting said slurry to screening through relatively fine perforations sized to accept only substantially fully defibered paper without preliminary screening thereof,
e. controlling the resulting accepted and rejected flows from said screening step to maintain at least approximately 20% of the solid materials in said slurry in said rejected flow,
f. subjecting said flow of rejected materials to a defibering action at a consistency not less than said pulping consistency,
g. substantially eliminating from the resulting defibered materials the non-fibrous constituents thereof, and
h. resubjecting the remaining materials to said screening step.

12. The method defined in claim 11 wherein said paper-containing materials comprise municipal solid waste, and said fine perforations are circular holes of the order of 0.050–0.079 inch in diameter.

* * * * *